May 19, 1925.
W. A. KING
WINDSHIELD
Filed May 24, 1923
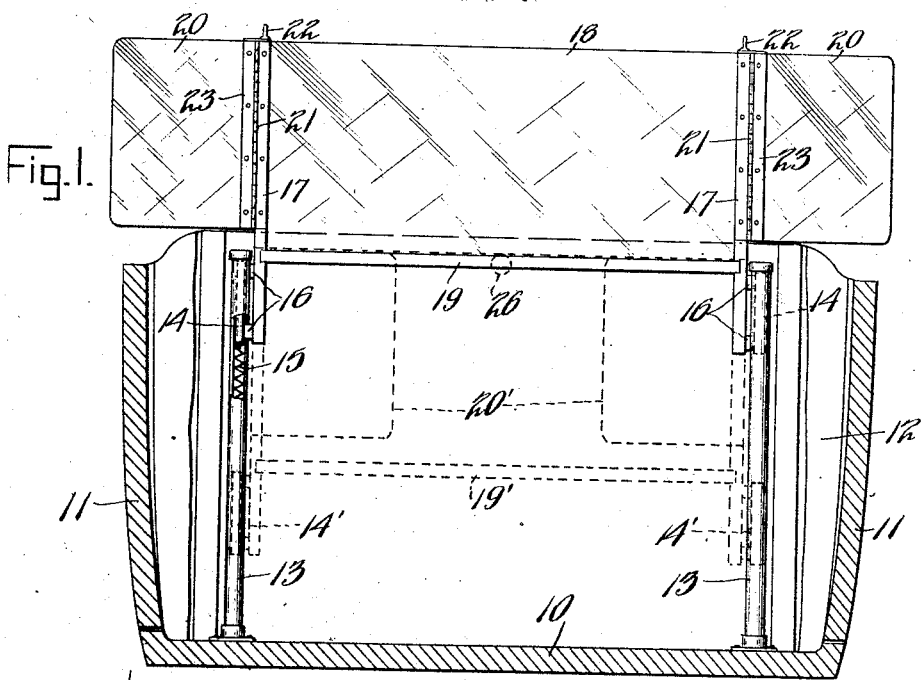
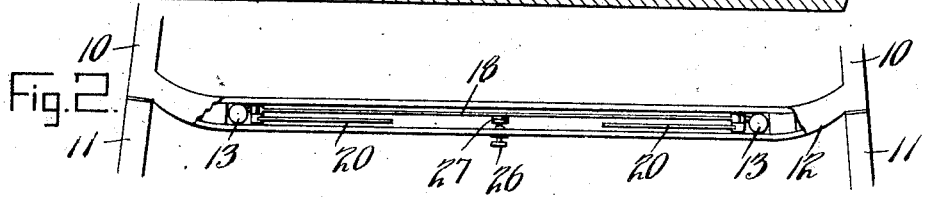
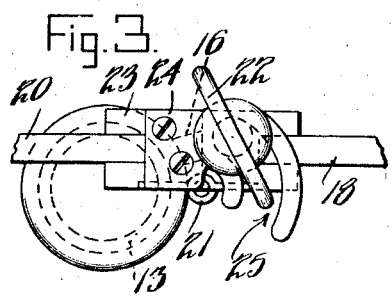
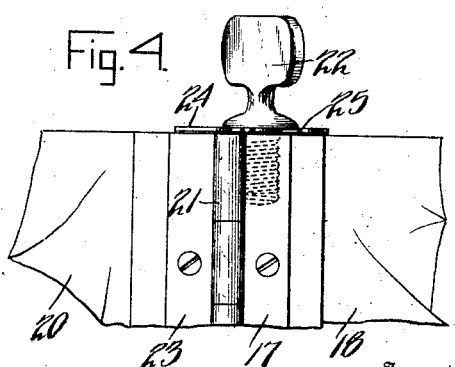
Inventor
William A. King.
By [signature]
Attorney Patented May 19, 1925.

1,538,333

UNITED STATES PATENT OFFICE.

WILLIAM A. KING, OF SEATTLE, WASHINGTON.

WINDSHIELD.

Application filed May 24, 1923. Serial No. 641,201.

*To all whom it may concern:*

Be it known that I, WILLIAM A. KING, a citizen of the United States, residing at Seattle, in the county of King and State of Washington, have invented certain new and useful Improvements in Windshields, of which the following is a specification.

My said invention relates to a tonneau windshield and it is an object of the same to provide a disappearing windshield for the rear seat or rear part of an automobile which may be brought into or out of active position in a rapid and convenient manner and which will be securely held in either of said positions.

A further object of the invention is to provide such a shield with lateral wings having means for setting them in any adjusted position relatively to the body of the windshield.

Referring to the accompanying drawings which are made a part hereof and on which similar reference characters indicate similar parts, Figure 1 is a vertical section of an automobile body with my device applied thereto, said section being taken at the rear of the windshield, Figure 2 is a plan of a part of an automobile body having my windshield applied thereto, Figure 3 is a fragment showing the means for fixing the wings in adjusted position, on an enlarged scale, and Figure 4 a vertical elevation of the same detail.

In the drawings reference character 10 indicates the body of an automobile having side doors 11 and a front seat, the back of which is indicated at 12. According to my invention the back of the front seat is hollow and contains a pair of hollow upright tubes 13 forming guides for a pair of plugs 14. Said tubes are closed at both ends and springs 15 are provided below the plugs, said springs tending normally to force the plugs from the lower dotted line position at 14' to the upper position, both positions being shown in Figure 1. Each of the plugs has a pair of lateral projections 16 and bars 17 at opposite sides of the windshield are fixed to the respective sets of projections so as to move up and down with the plugs. These bars extend to the top of the windshield and are rigidly secured to the body 18 thereof. A cross bar 19 is also secured to the bars and forms a lower support for said body member.

At each side of the body a wing 20 is pivotally secured thereto by a piano hinge 21 or the like said hinges providing secure but freely movable pivoted supports for the wings.

At the upper end of each bar 17 there is a screw 22 having a winged head and the retainer bar 23 carrying the adjacent wing of the windshield has secured to its upper end a plate 24 with a curved notch at 25.

In the operation of my device when the windshield is in raised position the screws 22 may be loosened and the wings swing into desired position whereupon the tightening of the screws will clamp the slotted plate 24 to the bars 17 and thus hold the wings in adjusted positon. A screw is provided at 26 in the back of the seat said screw having at its front end an enlarged or padded head 27 adapted to bear against the glass 18 and hold the same in raised or lowered position. If the occupants of the vehicle do not desire to use the windshield the screws 22 may be loosened and the wings folded back into the position shown in Figure 2 and in dotted lines at 20' in Figure 1 whereupon the entire windshield can be forced down against the tension of the springs 15 and held in lowered position by forcing the screw 26 against the member 18. Any convenient or desirable means may be used for closing the opening at the top of the seat back to conceal the windshield from sight.

It will be seen that the windshield is securely held either in raised or lowered position and that it may readily and conveniently be raised or lowered. Furthermore the parts are few and simple and not liable to get out of order. The combination of the springs and the screw 26 also provides for holding the windshield in place in a manner to prevent rattling.

Various modifications will occur to those skilled in the art and therefore I do not limit myself to the specific embodiment of the invention shown in the drawings and described in the specification but only as indicated in the appended claims.

Having thus fully described my said invention, what I claim as new and desire to secure by Letters Patent, is:

1. A tonneau windshield for automobiles comprising a hollow transverse member on the automobile body, hollow guides concealed in said member, said guides having their adjacent sides longitudinally slotted, plugs slidable in said guides having projections secured thereto and extending through said slots, a windshield secured to said projections, springs normally forcing the plugs upward, and means to secure the windshield in lowered position, substantially as set forth.

2. A tonneau windshield for automobiles comprising a hollow transverse member on the automobile body, hollow guides concealed in said member, said guides having their adjacent sides longitudinally slotted, plugs slidable in said guides having projections secured thereto and extending through said slots, a windshield secured to said projections, springs normally forcing the plugs upward, and means to secure the windshield in lowered position said means including a screw on the transverse body member having an enlarged head bearing against a part of the windshield, substantially as set forth.

3. A tonneau windshield comprising a body member, wings pivoted at each end of said body member, a supporting element secured adjacent each end of the body member and extending below the same, a bracing element connecting said supporting elements, a pair of hollow guides spaced apart to permit the body member and the supporting elements to be positioned therebetween, plugs slidable in said guides, and connecting elements extending through longitudinal slots in said guides and joining said plugs and supporting elements, substantially as set forth.

4. A tonneau windshield for automobiles comprising a body member, wings pivoted at each end of said body member, a supporting element secured at each end of the body member and extending below the same, a bracing element connecting said supporting elements below the body member, a pair of hollow guides concealed within the automobile body and spaced apart to permit said body member and said supporting elements to be positioned therebetween, plugs slidable in said guides, and spaced connecting elements extending through longitudinal slots in said guides and joining said plugs and said supporting elements, substantially as set forth.

5. A tonneau windshield comprising a body member, wings pivoted at each end of said body member, a supporting element secured adjacent each end of the body member and extending below the same, a bracing element connecting said supporting elements, a pair of hollow guides spaced apart to permit the body member and the supporting elements to be positioned therebetween, plugs slidable in said guides, and means for securing the windshield in adjusted position, substantially as set forth.

6. A tonneau windshield for automobiles comprising a body member, wings pivoted at each end of said body member, a supporting element secured at each end of the body member and extending below the same, a bracing element connecting said supporting elements below the body member, a pair of hollow guides concealed within the automobile body and spaced apart to permit said body member and said supporting elements to be positioned therebetween, plugs slidable in said guides, and means for securing said body member and said wings in adjusted positions, substantially as set forth.

In witness whereof, I have hereunto set my hand and seal at Seattle, Washington this 19th day of May, A. D. nineteen hundred and twenty-three.

WILLIAM A. KING. [L. S.]